Figure 1:
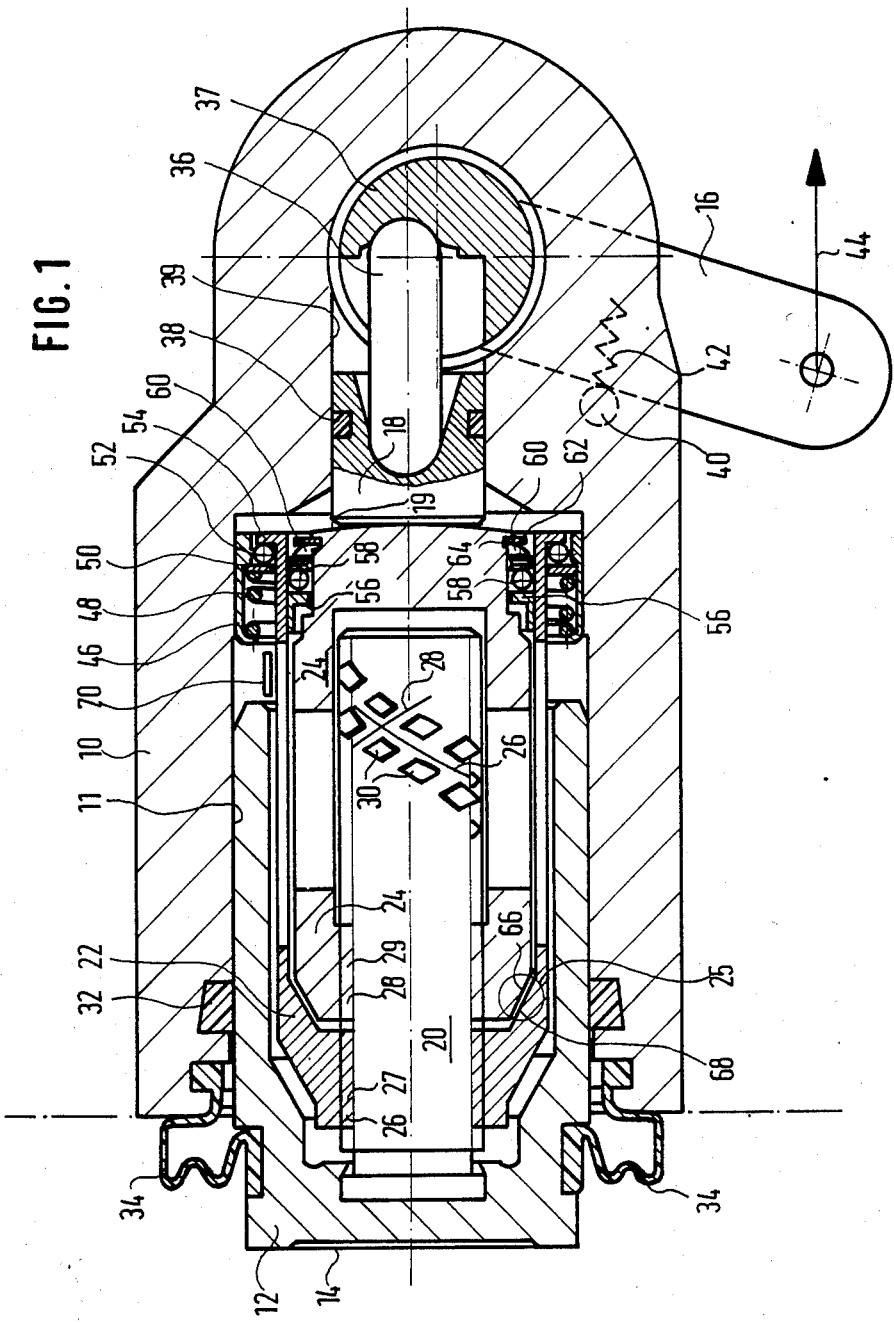

United States Patent [19]

Erben et al.

[11] Patent Number: 4,678,065

[45] Date of Patent: Jul. 7, 1987

[54] BRAKE ACTUATOR

[75] Inventors: Ralf Erben, Koblenz; Michael F. M. Walden, Andernach-Eich, both of Fed. Rep. of Germany

[73] Assignee: Lucas Industries Public Limited Company, Birmingham, England

[21] Appl. No.: 799,576

[22] Filed: Nov. 19, 1985

[30] Foreign Application Priority Data

Nov. 20, 1984 [DE] Fed. Rep. of Germany ... 8434025[U]

[51] Int. Cl.⁴ .................... F16D 55/16; B60T 7/00
[52] U.S. Cl. ........................ 188/196 D; 188/71.9; 188/72.6; 188/106 F; 74/58
[58] Field of Search .............. 188/71.8, 71.9, 72.6, 188/196 C, 196 D, 196 V, 106 F, 72.7, 72.9; 92/13; 74/58

[56] References Cited

U.S. PATENT DOCUMENTS

Re. 28,881  6/1976  Farr .................. 188/196 D
2,973,840  3/1961  Newell ............... 188/196 D
3,783,981  1/1974  Burgdorf ........... 188/71.9 X

FOREIGN PATENT DOCUMENTS 3220283  12/1983  Fed. Rep. of Germany.

Primary Examiner—Douglas C. Butler
Assistant Examiner—Matthew C. Graham
Attorney, Agent, or Firm—Scrivener and Clarke

[57] ABSTRACT

An adjustment device for a brake actuator including a spindle (20) is arranged between an hydraulically movable piston (12) and a mechanically movable tappet (18). The spindle (20) is formed at its outside with left- and right-hand threads (26) and (28), respectively, on which a collet (22) and an adjusting nut (24), respectively, are threaded in non-self-locking manner or, in other words, reversibly. The collet (22) and the adjusting nut (24) form a conical coupling (25) which, when engaged or closed prevents rotation of the structural members so that the adjustment device acts as a rigid member between the tappet (18) and the piston (12).

7 Claims, 2 Drawing Figures

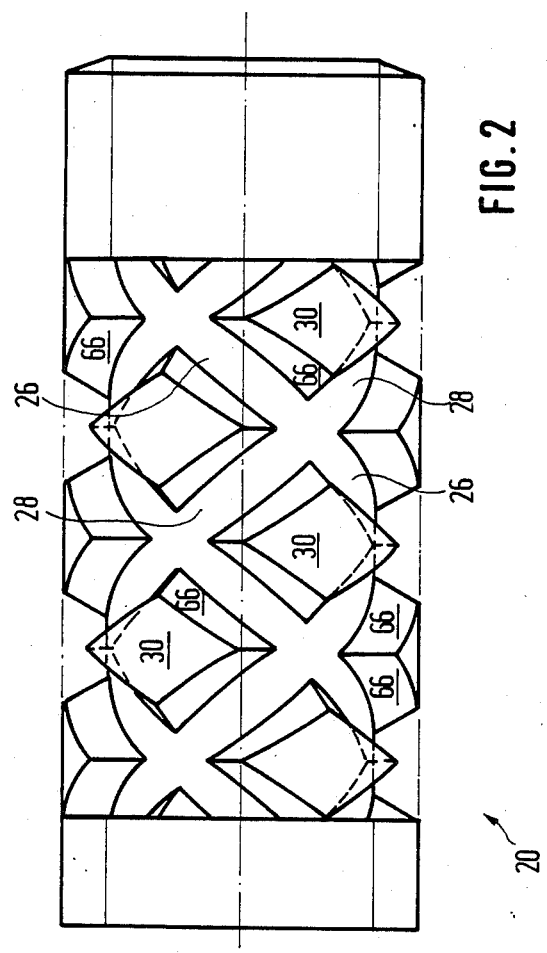

BRAKE ACTUATOR

The invention relates to a brake actuator, comprising a cylinder casing in which an hydraulically operable piston and a mechanically operable tappet are guided between which there is arranged an adjustment device for transmitting the mechanical actuating force and including a spindle and two screw thread pairs each being of non-self-locking type and having different pitches as well as a coupling which is engaged upon actuation of the tappet, thus preventing rotation of the screw thread pairs.

Such a brake actuator is known from DE-OS No. 32 20 283. In that case a hollow first spindle is arranged between the piston and the tappet, and a second spindle is arranged coaxially inside the first spindle and threadedly engaged with the piston by a non-self-locking or reversible screw thread pair. The coupling in that case is formed by coupling faces provided on the two spindles. After frequent brake actuations with that device the second spindle and a nut in threaded engagement with the first spindle remain substantially in the predetermined position, while the piston and a nut in threaded engagement with the second spindle travel out of the cylinder casing as the wear of the friction linings pro- gresses.

The overlapping of the threads between the second spindle and the associated nut must allow for this displacement of the piston.

In the case of the adjustment device known from DE-OS No. 32 20 283 adjustment of the clearance of the coupling depends on the length of the first spindle and this makes it difficult to adjust the clearance of the coupling mechanically, directly, and accurately.

It is an object of the invention to develop an automatic adjustment device of the kind specified initially such that sufficient overlapping of the threads is assured with the friction linings totally worn and that the clearance of the coupling can be adjusted mechanically with good accuracy. It is another object of the invention to minimize any resistance to movement occurring upon mechanical actuation of the brakes. Furthermore, it is an object of the instant invention to do with the smallest possible number of structural members in general.

In accordance with the invention these objects are met in that two intersecting threads are formed on or in the spindle and an adjusting nut and a collet, respectively, are threaded on or into those threads, and in that the coupling is formed by the adjusting nut and the collet.

As the linings wear, therefore, the adjusting nut and collet according to the invention remain substantially in the predetermined position, whereas the piston and spindle travel out of the casing. The overlapping of the threads thus is warranted even if the friction linings are worn.

Moreover, the adjustment device according to the invention disposes of all the advantages of the device known from DE-OS No. 32 20 283. The two screw thread pairs become mutually locked upon mechanical brake actuation when the coupling is engaged or closed. By virtue of this locking the rotatable members of the two pairs of screw threads, in other words the collet and the adjusting nut cannot rotate with respect to the piston. Consequently, when the coupling is engaged no torque is generated by the adjustment device. On the whole, the adjustment device behaves like a rigid intermediate member between the tappet and the piston when the brake is actuated mechanically. Upon release of the mechanical brake actuating pressure and thus of the coupling, the two pairs of screw threads regain their independence. Therefore, the collet and the adjusting nut rotate freely on the spindle as the piston moves with respect to the cylinder casing when the mechanical brake is not actuated.

In accordance with the invention the two pairs of screw threads are obtained by only three structural members, namely the spindle provided with two threads and the adjusting nut in threaded engagement with the same as well as the collet. The different pairs of screw threads may be realized in different ways. Preferably one pair of screw threads is a left-hand type, while the other one is right-handed. Furthermore, the pitch angles of the screw thread pairs may be varied.

The coupling is preferred to be of conical coupling design, the adjusting nut having a conical projection which engages in the collet of complementary configuration. The collet embraces the adjusting nut and the end of the spindle facing the tappet and thus has an end face in abutment with the tappet. With a preferred modification of the invention either the end face of the adjusting nut or of the tappet is crowned so as to keep the frictional torque low between the adjusting nut and the tappet.

In a preferred embodiment of the invention the frictional torques between the adjusting nut and the collet, on the one hand, and the non-rotating members are reduced by having each of the two supported axially by a respective ball or roller bearing.

The invention will be described further, by way of example, with reference to a diagrammatic drawing, in which: FIG. 1 is a longitudinal sectional view of a combined hydraulic and mechanical brake actuator in accordance with the invention of a floating caliper disc brake for motor vehicles, and FIG. 2 is an enlarged cut-out of FIG. 1.

As shown in FIG. 1, the brake actuator comprises a cylinder casing 10 which may be secured to or formed integrally with a floating caliper of a spot type disc brake. A hollow piston 12 is guided in a cylinder bore 11 of the cylinder casing 10. The piston 12 has an end face 14 by which it abuts against a backplate of a brake pad (not shown) when installed, pressing the brake pad into contact with a brake disc (not shown) upon actuation of the device. Brake fluid is introduced into the cylinder bore 11 through an inlet (not shown) for hydraulic brake actuation.

For mechanical actuation the brake includes a lever 16 which is provided at the cylinder casing 10 and by which a tappet 18 is movable in the direction of a spindle 20 fixed to the piston 12.

A collet 22 and an adjusting nut 24 are threaded on the spindle 20. To this end the spindle 20 is provided with a left-hand outer thread 26 for the collet 22 which in turn has a corresponding inner thread 27. The spindle 20 is provided with a right-hand outer thread 28 for the adjusting nut 24 which has a corresponding inner thread 29. The two threads 26 and 28 on the spindle 20 are crossing or intersecting each other. Because of the intersection, all that remains of both threads 26 and 28 are humps 30 of the shape of diamonds in horizontal projection, as shown more specifically in FIG. 2.

As usual, the piston 12 carries a sealing ring 32 which pushes back the piston 12 into the cylinder casing 10 following each brake actuation. The cylinder bore 11 moreover is protected against contamination by a sealing boot 34.

Transmission of the mechanical brake pressure (hand brake) to the tappet 18 is effected by way of a thrust piece 36 fastened eccentrically to a shaft 37 which is disposed in a bore formed in the cylinder casing 10 and extending at right angles with respect to the bore 11 and which is rotated by the lever 16. An annular seal 38 at the tappet 18 seals a bore 39 in which the tappet is guided.

The lever 16, when not actuated, is held against a stop 40 by the action of a return spring 42 connecting the lever to the cylinder casing 10. The lever 16 is pivoted and the shaft 37 rotated by a mechanical actuating force applied in the direction of arrow 44. Accordingly, the thrust piece 36 exerts pressure (to the left in FIG. 1) on the tappet 18 and the adjusting nut 24. The collet 22 and the adjusting nut 24 are supported both at their front portion remote from the tappet 18 as well as their rear portion, as seen in FIG. 1, with respect to the casing 10 as well as the spindle 20. To this end the collet 22 as well as the adjusting nut 24 extend beyond the rear end of the spindle 20. The collet 22 is supported as against the casing 10 by means of an insert 46, a spring 48, a disc 50, a roller bearing 52, and a flange 54 in which the collet 22 ends in the rear portion. The collet 22 is held in axially opposite direction, i.e. to the right in FIG. 1, by an insert 56, a roller bearing 58, a spring 60, a disc 62, a retaining ring 64, the adjusting nut 24, the tappet 18, the thrust piece 36, the lever 16, the spring 42, and the stop 40.

The clearance of the coupling, i.e. the axial spacing of complementary conical surfaces 66 and 68 provided at the collet 22 and adjusting nut 24, respectively, and forming the coupling 25 is adjusted as follows: A gauge is introduced between the lever 16 and the stop 40 so that the tappet 18 is pushed forwardly by an extent corresponding to the desired clearance of the coupling. Outside of the cylinder casing 10 the following structural members are assembled: collet 22, adjusting nut 24, insert 46, spring 48, disc 50, roller bearing 52, insert 56, roller bearing 58, disc 62, spring 60, and retaining ring 64. This unit is slipped on a tube 70 the inner diameter of which is only slightly greater than the outer diameter of the collet 22 and the outer diameter of which is smaller than the inner diameter of the spring 48. Thus the tube 70 may be pushed under the spring 48. The tube 70 is used to introduce the unit into the bore 11 of the cylinder casing. The tube 70 is pressed into the bore. In doing that, pressure is exerted on the insert 46 by way of the disc 50 and an extension of the insert 46 by virtue of which the insert is displaced axially in the precisely fitting bore in the casing. The insert 46 is pressed into the bore until the clearance of the coupling has been reduced to zero. Disappearance of the clearance of the coupling can be determined by a beginning pressure rise because in this condition the collet 22 is supported on the tappet 18 by way of the conical coupling 25 and the adjusting nut 24. Subsequently the gauge is removed from between the stop 40 and the lever 16, whereupon the lever 16 is moved against the stop 40 by the spring 42. This causes the tappet 18 to be moved to the right as seen in FIG. 1 so that the spring 60 embodied by a corrugated spring provides the distance between the collet 22 and the adjusting nut 24 defining the clearance of the coupling by expanding in axial direction.

Upon hydraulic actuation of the brake the piston 12 is pushed out of the cylinder casing 10. When the hand brake is inoperative so that the lever 16 rests against the stop 40, the collet 22 and the adjusting nut 24 rotate freely on the spindle 20. This rotation is largely without friction, only the minor frictions of the roller bearings 52 and 58, of the threads 26,27 and 28,29, as well as the friction between the adjusting nut 24 and the tappet 18 must be overcome. The end face 19 of the adjusting nut is crowned so as to keep the frictional torque between the adjusting nut 24 and the tappet 18 at a low level. Upon hydraulic actuation of the piston 12 thus the axial position of the adjustment device and the tappet 18 is not varied.

When the hand brake is actuated so that the lever 16 is pivoted in the direction of arrow 44, pressure is exerted on the adjusting nut 24 by way of the thrust piece 36 and the tappet 18, which pressure is directed to the left in FIG. 1. The adjusting nut 24 rotates freely on the thread 28 and closes the conical coupling 25. The collet 22 likewise tries to rotate but is prevented from doing that by the great frictional torque of the conical coupling 25. Consequently the adjusting nut and the collet move together with the spindle 20 and the piston 12 as one unit, moving to the left in FIG. 1.

Upon release of the mechanical brake, the lever 16 is pulled once more against the stop 40, and the spring 48 again presses the collet 22 into its initial position. The corrugated spring 60 opens the conical coupling 25 whereby the piston 12 again is freely movable.

The relative axial positions of the collet 22 and adjusting nut 24 do not change following hydraulic or mechanical brake actuation so that the predetermined clearance of the coupling is upheld.

FIG. 2 is a diagrammatic presentation of the configuration of the left- and right-hand threads 26 and 28. As a result of the intersection of the threads only the areas 30 having the supporting flanks 66 remain in place.

What is claimed is:

1. A brake actuator, comprising a cylinder casing (10) in which an hydraulically operable piston (12) and a mechanically operable tappet (18) are guided between which there is arranged an adjustment device for transmitting a mechanical actuating force and including a spindle (20) and two different screw thread pairs (26, 27; 28, 29) each being of non-self-locking type, and a coupling (25) being engaged upon actuation of the tappet to prevent relative rotation of the screw threads of ech pair characterized in that two threads (26, 28) are formed on said spindle, said threads (26, 28) intersecting over a co-extensive part of the length of the spindle (20), in that both an adjusting nut (24) and a collet (22) are threaded on said intersecting threads (26, 28), and in that the coupling (25) is formed by a friction surface between said adjusting nut (24) and said collet (22).

2. The brake actuator as claimed in claim 1, characterized in that one of the two threads (26,28) is a right-hand thread and the other one a left-hand thread.

3. The brake actuator as claimed in claim 1 or 2, characterized in that the coupling (25) is formed as a conical coupling, the collet (22) at least partly enclosing the adjusting nut (24).

4. The brake actuator as claimed in claim 1, characterized in that the adjusting nut (24) encloses the spindle (20) in the manner of a cap at the end thereof facing the tappet (18) and abuts against the tappet (18) by its end face (19).

5. The brake actuator as claimed in claim 4. characterized in that the end face (19) of the adjusting nut (24) and/or the end face of the tappet (18) is/are crowned.

6. The brake actuator as claimed in claim 1, characterized in that a spring (60) acting axially between the collet (22) and the adjusting nut (24) provides clearance of the coupling in the absence of any loading by the tappet (18).

7. The brake actuator as claimed in claim 1, characterized in that the collet (22) and/or the adjusting nut (24) is/are axially supported by a ball bearing (52;58).

* * * * *